(12) United States Patent
Geng

(10) Patent No.: US 10,170,073 B2
(45) Date of Patent: Jan. 1, 2019

(54) VEHICLE DRIVING ASSISTANCE APPARATUS

(71) Applicant: BOE TECHNOLOGY GROUP CO., LTD., Beijing (CN)

(72) Inventor: Lihua Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 205 days.

(21) Appl. No.: 15/207,782

(22) Filed: Jul. 12, 2016

(65) Prior Publication Data

US 2017/0270891 A1 Sep. 21, 2017

(30) Foreign Application Priority Data

Mar. 18, 2016 (CN) .......................... 2016 1 0158625

(51) Int. Cl.
*G09G 5/00* (2006.01)
*B60R 1/00* (2006.01)
(Continued)

(52) U.S. Cl.
CPC ............... *G09G 5/003* (2013.01); *B60R 1/00* (2013.01); *G02B 27/0101* (2013.01); *H04N 5/232* (2013.01); *H04N 5/332* (2013.01); *B60R 2300/103* (2013.01); *B60R 2300/108* (2013.01); *B60R 2300/205* (2013.01);
(Continued)

(58) Field of Classification Search
CPC ............... B60R 1/00; B60R 2300/103; B60R 2300/108; B60R 2300/205; B60R 2300/30; B60R 2300/406; B60R 2300/8053; G02B 2027/0138; G02B 2027/014; G02B 27/0101; G09G 2320/0646;
(Continued)

(56) References Cited

U.S. PATENT DOCUMENTS

| 9,774,797 | B2 * | 9/2017 | Richards | H04N 7/188 |
| 2006/0006331 | A1 * | 1/2006 | Adamietz | B60R 1/00 250/330 |
| 2006/0171704 | A1 * | 8/2006 | Bingle | B60R 11/04 396/419 |
| 2006/0186347 | A1 * | 8/2006 | Ohkawara | B60Q 1/143 250/472.1 |
| 2009/0101820 | A1 * | 4/2009 | Nakata | H04N 5/2254 250/330 |

(Continued)

FOREIGN PATENT DOCUMENTS

| CN | 202085243 | 12/2011 |
| CN | 202463699 | 10/2012 |

(Continued)

OTHER PUBLICATIONS

Office Action from corresponding Chinese Application No. 201610158625.X dated Sep. 4, 2017 (8 pages).

*Primary Examiner* — Dmitriy Bolotin
(74) *Attorney, Agent, or Firm* — Harness, Dickey & Pierce, P.L.C.

(57) ABSTRACT

The present disclosure provides a vehicle driving assistant apparatus, comprising: an infrared image acquiring module for acquiring information of an infrared image of an object ahead of a vehicle; a display module connected with the infrared image acquiring module, for displaying a corresponding image according to the information of the infrared image acquired by the infrared image acquiring module. The disclosure enables the driver to see the road conditions ahead by means of the vehicle driving assistant apparatus even when facing glaring light emitted from ahead when driving at night, thus reducing the occurrence of traffic accidents.

20 Claims, 1 Drawing Sheet

(51) Int. Cl.
*G02B 27/01* (2006.01)
*H04N 5/232* (2006.01)
*H04N 5/33* (2006.01)

(52) U.S. Cl.
CPC ..... *B60R 2300/30* (2013.01); *B60R 2300/406* (2013.01); *B60R 2300/8053* (2013.01); *G02B 2027/014* (2013.01); *G02B 2027/0138* (2013.01); *G09G 2320/0646* (2013.01); *G09G 2360/144* (2013.01); *G09G 2380/10* (2013.01)

(58) Field of Classification Search
CPC ......... G09G 2360/144; G09G 2380/10; G09G 5/003; H04N 5/232; H04N 5/332
See application file for complete search history.

(56) References Cited

U.S. PATENT DOCUMENTS

| | | | |
|---|---|---|---|
| 2010/0019151 A1* | 1/2010 | Shimizu | B60R 1/00 250/330 |
| 2013/0208118 A1 | 8/2013 | Wu | |
| 2016/0341848 A1* | 11/2016 | Nakamura | G06K 9/00 |

FOREIGN PATENT DOCUMENTS

| | | |
|---|---|---|
| CN | 202499079 | 10/2012 |
| CN | 202713506 | 1/2013 |
| CN | 205468793 | 8/2016 |
| DE | 102005041467 | 3/2007 |

* cited by examiner

VEHICLE DRIVING ASSISTANCE APPARATUS

CROSS-REFERENCE TO RELATED APPLICATION

This application claims the benefit and priority of Chinese Patent Application 201610158625.X filed Mar. 18, 2016. The entire disclosure of the above application is incorporated herein by reference.

FIELD

The present disclosure relates to the traffic safety field, and more particularly to a vehicle driving assistance apparatus.

BACKGROUND

This section provides background information related to the present disclosure which is not necessarily prior art.

With the rapid development of the automobile industry and increasing popularization of automobiles, the road safety problem has become more and more severe. Compared with driving in daytime, driving at night is more dangerous, and many traffic accident occurred when vehicles passing each other in opposite directions at night. As shown in FIG. 1, when passing each other in opposition directions, if vehicle 2 opposite vehicle 1 turns on the high beam headlight, the driver in vehicle 1, stimulated by the glare, will have expanded pupils, and have difficulty seeing the road conditions ahead. Especially at the instantaneous moment after the passing ends, the driver will see nothing but complete darkness, which is very conducive to a traffic accident.

SUMMARY

This section provides a general summary of the disclosure, and is not a comprehensive disclosure of its full scope or all of its features.

An object of the present disclosure is to provide a vehicle driving assistant apparatus in order to reduce the occurrence of traffic accidents when driving at night.

Embodiments of the present disclosure provide a vehicle driving assistant apparatus, comprising:

an infrared image acquiring module for acquiring information of an infrared image of an object ahead of a vehicle;

a display module connected with the infrared image acquiring module for displaying a corresponding image according to the information of the infrared image acquired by the infrared image acquiring module.

Optionally, the infrared image acquiring module comprises:

an infrared emitting unit for emitting infrared light ahead of the vehicle;

an image acquiring unit for generating information of an infrared image of an object ahead of the vehicle according to the infrared light reflected back from the object, the display module being connected with the image acquiring unit.

Optionally, the image acquiring unit comprises a camera, and the infrared image acquiring module further comprises a visible light filter disposed on the external surface of the lens of the camera, and for filtering out the visible light impinging on the lens.

Optionally, the vehicle driving assistant apparatus further comprises a luminance detection module, a luminance comparing module and an infrared driving module, the luminance detection module is for detecting the luminance of the visible light transmitted to the vehicle from ahead of the vehicle;

the luminance comparing module is connected with the luminance detection module and the infrared driving module respectively, and for comparing the luminance of the visible light detected by the luminance detection module and a preset value; when the luminance of the visible light is greater than or equal to the preset value, the luminance comparing module is able to send a first signal to the infrared driving module; and when the luminance of the visible light is less than the preset value, the luminance comparing module is able to send a second signal to the infrared driving module;

the infrared driving module is connected with the infrared image acquiring module, and is for controlling the infrared image acquiring module to be activated when receiving the first signal, and for controlling the infrared image acquiring module to be deactivated when receiving the second signal.

Optionally, the luminance detection module comprises a luminance sensor.

Optionally, the vehicle driving assistant apparatus further comprises a wearable entity worn on the body of the driver, with the luminance sensor disposed on the wearable entity.

Optionally, the wearable entity comprises a spectacles frame.

Optionally, the vehicle driving assistant apparatus further comprises a wireless communication module, wherein the wireless communication module comprises a signal sending end connected with the luminance detection module and a signal receiving end connected with the luminance comparing module, and between the signal sending end and the signal receiving end wireless communication can be conducted.

Optionally, the display module comprises:

a display driving unit connected with the infrared image acquiring module, for converting the information of the infrared image into a corresponding signal of gray scale data;

an image display unit connected with the display driving unit, for displaying a corresponding image according to the signal of gray scale data.

Optionally, the image display unit comprises a transparent display panel.

Optionally, the transparent display panel is disposed at the periphery of the front windshield of the vehicle.

Optionally, the image display unit comprises a backlight source, a display panel disposed at the light exit side of the backlight source, and a semi-transparent semi-reflective film disposed on the light exit side of the display panel, the backlight source is connected with the infrared driving module, and the infrared driving module is able to control the backlight source to emit light when receiving the first signal, and is able to control the backlight source to stop emitting light when receiving the second signal.

Optionally, the vehicle driving assistant apparatus further comprises:

a display processing module connected between the infrared image acquiring module and the display module, for performing image enhancement processing on the infrared image acquired by the image acquiring module, and sending the processed information to the display module.

Optionally, the image enhancement processing comprises image sharpening processing.

Optionally, the infrared image acquiring module is able to acquire the information of multiple frames of infrared image of an object ahead of the vehicle successively, and the image processing module is able to perform image enhancement processing on the information of the multiple frames of infrared image successively;

the vehicle driving assistant apparatus further comprises a signal transmission module connected between the image processing module and the display module, for transmitting the processed information of the multiple frames of infrared image to the display module sequentially.

In the invention, since the infrared image acquiring module acquires information of an infrared image of an object ahead of the vehicle, and the display module can display the infrared image of the object ahead of the vehicle, when glaring light is shone on the driver from ahead of the vehicle, making the driver unable to see the road conditions ahead, the driver can be aware of the road conditions ahead through the infrared image displayed by the display module, thus reducing the occurrence of traffic accidents.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
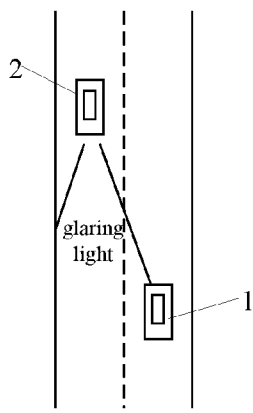
FIG. 1 illustrates a situation in which an opposite vehicle turning on the high beam headlight when the two vehicles passing each other in opposite directions.

Here the accompanying drawings are incorporated into the specification and form a part of the specification, in order to illustrate embodiments in accordance with the present disclosure and to interpret the principles of the present disclosure together with the description.

Corresponding reference numerals indicate corresponding parts or features throughout the several views of the drawings.

DETAILED DESCRIPTION

Example embodiments will now be described more fully with reference to the accompanying drawings.

Figure 2:
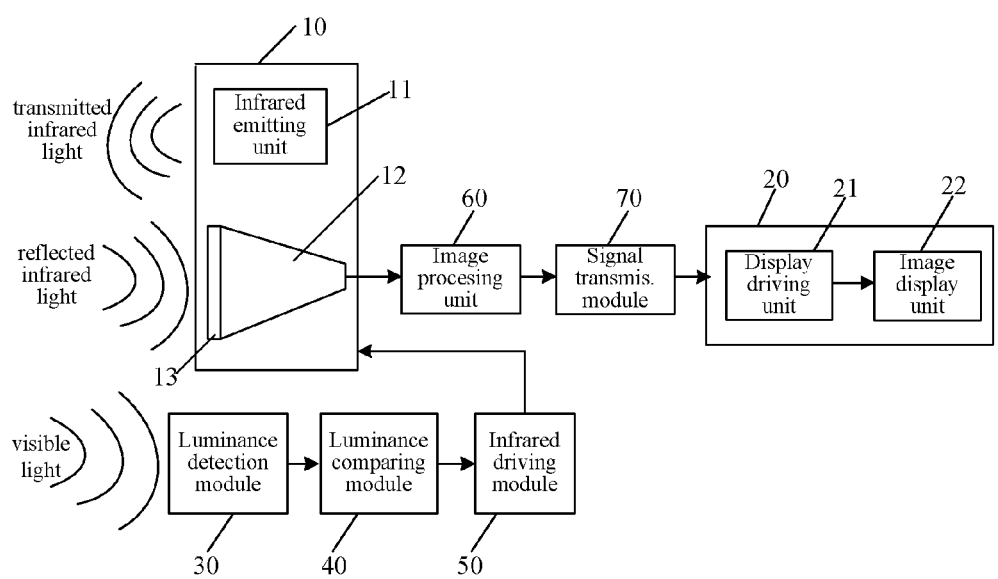
FIG. 2 illustrates a vehicle driving assistant apparatus according to an embodiment of the present invention.

Embodiments of the disclosure provide a vehicle driving assistant apparatus. As shown in FIG. 2, the apparatus comprises an infrared image acquiring module 10 and a display module 20. The infrared image acquiring module 10 is for acquiring information of an infrared image of an object ahead of a vehicle; the display module 20 is connected with the infrared image acquiring module 10, for displaying a corresponding image according to the information of the infrared image acquired by the infrared image acquiring module. "Connection" herein may be a wired connection or a wireless connection, provided only that transmission of signals may be enabled.

When the vehicle driving assistance apparatus is used, the display module 20 may be disposed within a vehicle, e.g., beside the rear-view mirror, at the periphery of the front windshield, etc. When glaring light from ahead of the vehicle is shone on the driver, making the driver unable to see the road conditions ahead, since the infrared image acquiring module 10 acquires the information of an infrared image of an object ahead of the vehicle, and the display module 20 can display the infrared image of the object ahead of the vehicle, the driver can be aware of the road conditions ahead through the infrared image displayed by the display module, thus reducing the occurrence of traffic accidents.

The infrared image acquiring module 10 may generate an infrared image of an object ahead of the vehicle based on the infrared light emitted by the object itself; or it may emit infrared light to an object ahead, and generate an infrared image of the object based on the infrared light reflected back from the object. In an embodiment of the invention, as shown in FIG. 2, the infrared image acquiring module 10 comprises an infrared emitting unit 11 and an image acquiring unit 12, the infrared emitting unit 11 being for emitting infrared light ahead of the vehicle. For example, the infrared emitting unit 11 may comprise a plurality of infrared light emitting diodes. The image acquiring unit 12 is for generating information of an infrared image of an object ahead of the vehicle according to the infrared light reflected back from the object, wherein the display module 20 is connected with the image acquiring unit 12. In a practical application, the infrared emitting unit 11 and the image acquiring unit 12 may be disposed in the front of the vehicle.

Optionally, the image acquiring unit 12 may comprise a camera. Optionally, as shown in FIG. 2, the infrared image acquiring module 10 may further comprise a visible light filter 13 disposed on the external surface of the lens of the camera, and for filtering out the visible light impinging on the lens, so as to reduce the influence of the visible light on the image acquiring unit 12 receiving the infrared light, thus making the infrared image displayed by the display module 20 be clearer.

Further optionally, the vehicle driving assistant apparatus may further comprise a luminance detection module 30, a luminance comparing module 40 and an infrared driving module 50. The luminance detection module 30 is for detecting the luminance of the visible light transmitted to the vehicle from ahead of the vehicle. The luminance comparing module 40 is connected with the luminance detection module 30 and the infrared driving module 50 respectively, and for comparing the luminance of the visible light detected by the luminance detection module 30 and a preset value; when the luminance of the visible light is greater than or equal to the preset value, the luminance comparing module 40 is able to send a first signal to the infrared driving module 50; and when the luminance of the visible light is less than the preset value, the luminance comparing module 40 is able to send a second signal to the infrared driving module 50; the infrared driving module 50 is connected with the infrared image acquiring module 10, and is for controlling the infrared image acquiring module 10 to be activated when receiving the first signal, so as to make the infrared image acquiring module 10 to start acquiring the information of the infrared image; and for controlling the infrared image acquiring module 10 to be deactivated when receiving the second signal, so as to make infrared image acquiring module 10 to stop acquiring the information of the infrared image.

When the infrared image acquiring module 10 comprises the infrared emitting unit 11 and the image acquiring unit 12, the infrared driving module 50 may be connected with the infrared emitting unit 11, and by controlling the infrared emitting unit 11 to emit infrared light or not, correspondingly control the infrared image acquiring module 10 to turn on or off; it may also be connected with the image acquiring unit 12, and by controlling the image acquiring unit 12 to receive the infrared light reflected from the object or not, correspondingly control the infrared image acquiring module 10 to turn on or off. The preset value may be set according to the maximum luminance that a human eye can stand at night. Thus, the infrared image acquiring module 10 may not work continuously, and may be activated only when visible light with large luminance is emitted from a vehicle ahead of the present vehicle; and when the luminance of the visible light emitted by a vehicle ahead of the present vehicle is small, the infrared image acquiring module 10 may be deactivated, thus saving the power consumption of the vehicle driving assistance apparatus.

Optionally, the luminance detection module 30 may comprise a luminance sensor, which is connected with the luminance comparing module 40.

The luminance sensor may be disposed on the vehicle body, e.g., at a position in the front of the vehicle. Thus, when glaring light is shone on the luminance sensor, it may be considered that the glaring light is also shone into the human eyes. Moreover, in order to more accurately determine whether light with large luminance is shone into the human eyes, the vehicle driving assistant apparatus may further comprise a wearable entity worn on the body of the driver, with the luminance sensor disposed on the wearable entity. It can be understood that the position of the luminance sensor on the wearable entity can be such that when the wearable entity is worn by the driver, the light receiving end of the luminance sensor can receive the light within the sight of the driver, that is, when the luminance sensor receives light, the human eyes can also receive the light.

Optionally, the wearable entity comprises a spectacles frame.

Further optionally, the vehicle driving assistant apparatus further comprises a wireless communication module, wherein the wireless communication module comprises a signal sending end connected with the luminance detection module 30 and a signal receiving end connected with the luminance comparing module 40, and between the signal sending end and the signal receiving end wireless communication can be conducted. Thus, when the luminance detecting module 30 is disposed on the wearable entity, and the luminance comparing module 40 is disposed on the vehicle, signal transmission may be conducted between the two through the wireless communication module, which may be a Bluetooth module, etc.

In order to be able to display a corresponding image based on the information of the infrared image, specifically and optionally, the display module 20 may comprise a display driving unit 21 and an image display unit 22, wherein the display driving unit 21 is connected with the infrared image acquiring module 10, for converting the information of the infrared image into a corresponding signal of gray scale data; and the image display unit 22 is connected with the display driving unit 21, for displaying a corresponding image according to the signal of gray scale data.

The information of the infrared image may be gray scale values of the pixels of the infrared image, and the signal of gray scale data may be an electrical signal, for driving the image display unit 22 to display corresponding gray scales at the positions of the pixels of the infrared image, thus displaying the infrared image of the object ahead.

As a specific implementation of the invention, the image display unit 22 comprises a transparent display panel for transparently displaying. Thus, when the transparent display panel is disposed in front of the position of the driver, even if the transparent display panel displays an image when there is no glaring light shone on the vehicle, the driver can see both the displayed image and the actual scene across the transparent display panel at the same time, thus not affecting normal driving of the driver.

Specifically and optionally, the transparent display panel may be disposed at the periphery of the front windshield of the vehicle, that is, the region of the front windshield adjacent to the window frame in which it is installed. There would be no much difference between the effect of seeing ahead through the region of the front windshield without the transparent display panel and the effect of seeing ahead through the transparent display panel, and thus the setting of the transparent display panel will not affect the view of the driver.

As another implementation of the invention, the image display unit 22 comprises a backlight source, a display panel disposed at the light exit side of the backlight source, and a semi-transparent semi-reflective film disposed on the light exit side of the display panel. The backlight source is connected with the infrared driving module 50, and the infrared driving module 50 is able to control the backlight source to emit light when receiving the first signal, and is able to control the backlight source to stop emitting light when receiving the second signal. When the luminance comparing module 40 determines that the luminance of the visible light shone on the vehicle from ahead is greater than or equal to the preset value, a first signal may be sent to the infrared image acquiring module 10 and the backlight source, so that the infrared image acquiring module 10 is able to acquire the infrared image, and at the same time the backlight source emits light to the display panel, which then displays the image, and thus through the light transmittance effect of the semi-transparent semi-reflective film, the driver can see the displayed image. When the luminance comparing module 40 determines that the luminance of the visible light shone on the vehicle from ahead is less than the preset value, a second signal may be sent to the infrared image acquiring module 10 and the backlight source, so that the infrared image acquiring module 10 no longer acquires the infrared image, and at the same time the backlight source stops emitting light, so the display panel no longer displays the image, in which case, due to the light reflection effect of the semi-transparent semi-reflective film, the display panel provided with the semi-transparent semi-reflective film acts like a reflection mirror. Therefore, the display panel provided with the semi-transparent semi-reflective film has both the function of display and the function of reflection, and may be used as a rear-view mirror of the vehicle, thus reducing the space occupancy within the vehicle.

Further optionally, as shown in FIG. 2, the driving assistant apparatus further comprises an image processing module 60 connected between the infrared image acquiring module 10 and the display module 20, for performing image enhancement processing on the infrared image acquired by the image acquiring module 10, and sending the processed information to the display module 20, so as to make the image displayed by the display module 20 more discernible.

Specifically and optionally, the image enhancement processing comprises image sharpening processing, so as to enhance the contrast of the edges of the infrared image, thus making the image displayed by the display module 20 clearer.

In real situations, it is often needed to acquire a video of the road conditions ahead. Specifically, the infrared image acquiring module 10 is able to acquire the information of multiple frames of infrared image of an object ahead of the vehicle successively, and the image processing module 60 is able to correspondingly perform image enhancement processing on the information of the multiple frames of infrared image successively. The vehicle driving assistant apparatus further comprises a signal transmission module 70 connected between the image processing module 60 and the display module 20, for transmitting the processed information of the multiple frames of infrared image to the display module 20 sequentially. Specifically, the signal transmission module 70 may transmit the processed information of the multiple frames of infrared image to the display driving unit 21 of the display module 20 sequentially, so as to enable the image display unit 22 to display the successive images. Therein, the signal transmission module 70 may transmit by means of the Low Voltage Differential Signaling (LVDS).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A vehicle driving assistant apparatus comprising:
an infrared image acquiring module for acquiring information of an infrared image of an object ahead of a vehicle;
a luminance detection module for detecting the luminance of visible light transmitted to the vehicle from ahead of the vehicle;
an infrared driving module connected with the infrared image acquiring module;
a luminance comparing module connected with the luminance detection module and the infrared driving module, the luminance comparing module for comparing the luminance of the visible light detected by the luminance detection module and a preset value, sending a first signal to the infrared driving module when the luminance of the visible light is greater than or equal to the preset value, and sending a second signal to the infrared driving module when the luminance of the visible light is less than the preset value; and
a display module connected with the infrared image acquiring module, the display module for displaying a corresponding image according to the information of the infrared image acquired by the infrared image acquiring module;
wherein the infrared driving module is configured to activate the infrared image acquiring module when receiving the first signal, and deactivate the infrared image acquiring module when receiving the second signal.

2. The vehicle driving assistant apparatus according to claim 1, wherein the infrared image acquiring module comprises:
an infrared emitting unit for emitting infrared light ahead of the vehicle; and
an image acquiring unit connected with the display module, the image acquiring unit configured to generate information of an infrared image of an object ahead of the vehicle according to the infrared light reflected back from the object.

3. The vehicle driving assistant apparatus according to claim 2, wherein the image acquiring unit comprises a camera having a lens, and wherein the infrared image acquiring module further comprises a visible light filter disposed on an external surface of the lens of the camera, and for filtering out the visible light impinging on the lens.

4. The vehicle driving assistant apparatus according to claim 2, further comprising:
an image processing module connected between the infrared image acquiring module and the display module, the image processing module configured to perform image enhancement processing on the infrared image acquired by the image acquiring module, and send the processed information to the display module.

5. The vehicle driving assistant apparatus according to claim 1, wherein the luminance detection module comprises a luminance sensor.

6. The vehicle driving assistant apparatus according to claim 5, further comprising a wearable entity configured to be worn by a driver of the vehicle, wherein the luminance sensor is disposed on the wearable entity.

7. The vehicle driving assistant apparatus according to claim 6, wherein the wearable entity comprises a spectacles frame.

8. The vehicle driving assistant apparatus according to claim 7, further comprising a wireless communication module, wherein the wireless communication module comprises a signal sending end connected with the luminance detection module and a signal receiving end connected with the luminance comparing module.

9. The vehicle driving assistant apparatus according to claim 6, further comprising a wireless communication module, wherein the wireless communication module comprises a signal sending end connected with the luminance detection module and a signal receiving end connected with the luminance comparing module.

10. The vehicle driving assistant apparatus according to claim 1, further comprising a wireless communication module, wherein the wireless communication module comprises a signal sending end connected with the luminance detection module and a signal receiving end connected with the luminance comparing module.

11. The vehicle driving assistant apparatus according to claim 10, further comprising:
an image processing module connected between the infrared image acquiring module and the display module, the image processing module configured to perform image enhancement processing on the infrared image acquired by the image acquiring module, and send the processed information to the display module.

12. The vehicle driving assistant apparatus according to claim 1, wherein the display module comprises:
a display driving unit connected with the infrared image acquiring module, the display driving unit configured to convert for converting the information of the infrared image into a corresponding signal of gray scale data; and
an image display unit connected with the display driving unit, the image display unit for displaying a corresponding image according to the signal of gray scale data.

13. The vehicle driving assistant apparatus according to claim 12, wherein the image display unit comprises a transparent display panel.

14. The vehicle driving assistant apparatus according to claim 13, wherein the transparent display panel is disposed at a periphery of a front windshield of the vehicle.

15. The vehicle driving assistant apparatus according to claim 12, wherein the image display unit comprises a backlight source, a display panel disposed at a light exit side of the backlight source, and a semi-transparent semi-reflective film disposed on the light exit side of the display panel, the backlight source connected with the infrared driving module, and the infrared driving module configured to control the backlight source to emit light when receiving the first signal and stop emitting light when receiving the second signal.

16. The vehicle driving assistant apparatus according to claim 1, further comprising:
    an image processing module connected between the infrared image acquiring module and the display module, the image processing module configured to perform image enhancement processing on the infrared image acquired by the image acquiring module, and send the processed information to the display module.

17. The vehicle driving assistant apparatus according to claim 16, wherein the image processing module is configured to perform image sharpening processing.

18. The vehicle driving assistant apparatus according to claim 16, wherein the infrared image acquiring module is configured to acquire the information of multiple frames of infrared image of an object ahead of the vehicle successively, and wherein the image processing module is configured to perform image enhancement processing on the information of the multiple frames of infrared image successively, the vehicle driving assistant apparatus further comprising a signal transmission module connected between the image processing module and the display module, the signal transmission module configured to transmit the processed information of the multiple frames of infrared image to the display module sequentially.

19. A vehicle driving assistant apparatus comprising:
    an infrared image acquiring module for acquiring information of an infrared image of an object ahead of a vehicle;
    a luminance detection module for detecting the luminance of visible light transmitted to the vehicle from ahead of the vehicle;
    an infrared driving module connected with the infrared image acquiring module; and
    a luminance comparing module connected with the luminance detection module and the infrared driving module, the luminance comparing module for comparing the luminance of the visible light detected by the luminance detection module and a preset value, sending a first signal to the infrared driving module when the luminance of the visible light is greater than or equal to the preset value, and sending a second signal to the infrared driving module when the luminance of the visible light is less than the preset value;
    wherein the infrared driving module is configured to activate the infrared image acquiring module when receiving the first signal, and deactivate the infrared image acquiring module when receiving the second signal.

20. The vehicle driving assistant apparatus according to claim 19, further comprising a wireless communication module, wherein the wireless communication module comprises a signal sending end connected with the luminance detection module and a signal receiving end connected with the luminance comparing module.

* * * * *